A. Roff.
Lock Nut.

No. 88,908.      Patented Apr. 13, 1869.

Witnesses:
John F. Brooks
George W. Mabee

Inventor:
A. Roff.
per Munn & Co
Attorneys

UNITED STATES PATENT OFFICE.

ALMON ROFF, OF SOUTHPORT, CONNECTICUT.

IMPROVEMENT IN LOCK-NUTS.

Specification forming part of Letters Patent No. 88,908, dated April 13, 1869.

*To all whom it may concern:*

Be it known that I, ALMON ROFF, of Southport, in the county of Fairfield and State of Connecticut, have invented a new and useful Improvement in Lock-Nuts; and I do hereby declare that the following is a full, clear, and exact description thereof, which will enable others skilled in the art to make and use the same, reference being had to the accompanying drawings, forming part of this specification, in which—

Figure 6:
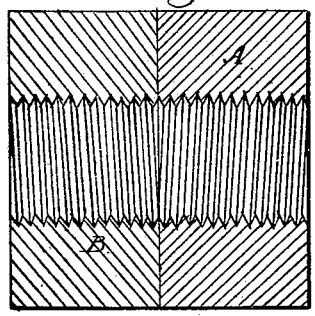
Figure 1:
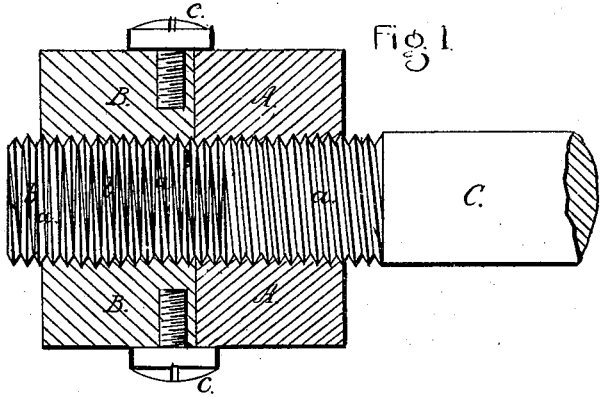
Figure 4:
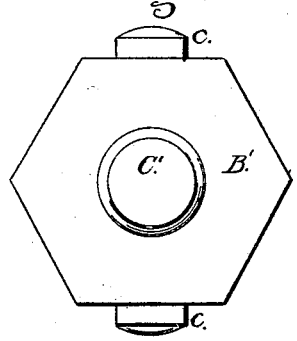
Figure 2:
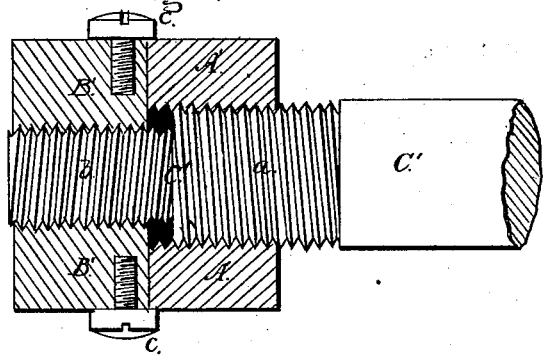
Figure 5:
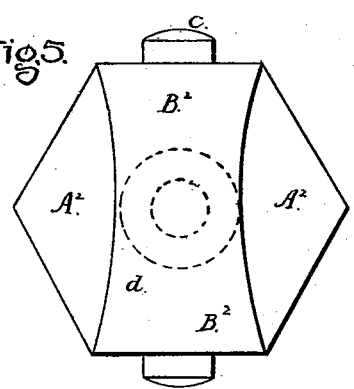
Figure 3:
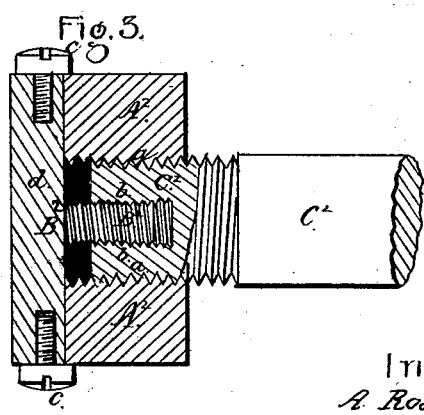

Figures 1, 2, and 3 are longitudinal sections of different modifications of my new arrangement of lock-nuts, showing them fitted upon screws. Figs. 4 and 5 are end views of the same. Fig. 6 is a detail longitudinal section of two lock-nuts put together.

Similar letters of reference indicate corresponding parts.

The object of this invention is to so arrange a system of nuts on screws or bolts that when said nuts have been adjusted on the screws they cannot be displaced spontaneously by jarring or other motion.

The invention consists in the application to one screw of a right-and-left-hand nut working on separate corresponding threads, or of one nut and one screw working in opposite directions, and of set-screws for locking the nuts together when they are adjusted.

When two nuts, or a nut and screw, working in opposite directions are so connected that they cannot be separately turned, it is evident that they cannot be moved in either direction, and that they are therefore firmly locked to the screw.

In order to mount two nuts, A and B, which have their threads cut in different directions, as shown in Fig. 6, upon one single shaft, C, and close together, the shaft must have corresponding threads cut on it. This can be done, as in Fig. 1, by having a right-hand thread, *a*, cut on the shaft, to receive the nut A, and a left-hand thread, *b*, on the outer part, to receive the nut B.

To allow the nut A to pass over the part *b*, the thread *a* must continue through that portion where the thread *b* is cut, and therefore a double thread, *a b*, is cut on the shaft, the lines crossing each other, as in Fig. 1.

When the nut A has been screwed to the requisite place the nut B is applied and screwed close against A, as shown.

Set-screws *c c*, arranged in the edges of one or both of the nuts A B, are now turned down so that their heads lap over the edges of both nuts at once, as shown in Fig. 1.

The nuts, being prismatic, cannot be turned separately, as the heads of *c* lock them together, and they cannot be turned jointly, as their heads are cut in opposite directions.

When the threads *a b* are not to be crossed, as in Fig. 1, the outer thread, *b*, may be cut on a smaller portion of the shaft C', as in Fig. 2, to receive a nut, B', with a smaller bore than the nut A', which is screwed upon the larger part *a* of the shaft. The size of the two nuts should, however, correspond, as in Fig. 2, so that they may be locked by the screw *c c*, as in Fig. 2. The threads *a b* are, in the latter case, also in opposite directions, as shown.

Substantially the same invention may be applied by using the nut $A^2$ and a screw, $B^2$, on a shaft, $C^2$, as in Figs. 3 and 5.

The nut $A^2$ has its thread so arranged, in conjunction with the thread *a* on $C^2$, that it is turned in the opposite direction to that in which the screw $B^2$ is turned when applied.

The screw $B^2$ is fitted into a female thread, *b*, provided in the end of the shaft $C^2$, as shown.

The head *d* of the screw $B^2$ should be as long as the nut $A^2$ is wide, so that it may reach to the edges of the same, to be locked by the set-screws *c*, in the manner substantially shown in Figs. 3 and 5.

It is evident that the parts $A^2 B^2$ cannot be turned in either direction, separately or jointly, when locked by the screws *c*, in the manner shown.

Having thus described my invention, what I claim as new, and desire to secure by Letters Patent, is—

1. Providing a shaft, C, with double thread *a* and *b*, crossing each other, as shown in Fig. 1, to allow a right-hand nut to pass over a thread adapted to a left-hand nut, and vice versa, as specified.

2. The combination of the screws *c* with the nuts A B and screw-shaft C, substantially as described, for the purpose specified.

ALMON ROFF.

Witnesses:
LAWRENCE FINNERTY,
JANE A. B. DRESSER.